US012570415B2

(12) United States Patent
Nielsen et al.

(10) Patent No.: US 12,570,415 B2
(45) Date of Patent: *Mar. 10, 2026

(54) UAV WITH MANUAL FLIGHT MODE SELECTOR

(71) Applicant: Snap Inc., Santa Monica, CA (US)

(72) Inventors: Simon Nielsen, Beverly Hills, CA (US); Russell Douglas Patton, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,810

(22) Filed: Mar. 19, 2024

(65) Prior Publication Data

US 2024/0262498 A1 Aug. 8, 2024

Related U.S. Application Data

(63) Continuation of application No. 16/833,526, filed on Mar. 28, 2020, now Pat. No. 11,945,579.

(51) Int. Cl.
| | |
|---|---|
| *B64U 20/87* | (2023.01) |
| *B64C 19/00* | (2006.01) |
| *B64U 10/14* | (2023.01) |
| *B64U 60/50* | (2023.01) |
| *B64U 101/30* | (2023.01) |
| *G05D 1/00* | (2024.01) |
| *G06F 3/0362* | (2013.01) |
| *B64U 50/14* | (2023.01) |

(52) U.S. Cl.
CPC .............. *B64U 20/87* (2023.01); *B64C 19/00* (2013.01); *B64U 10/14* (2023.01); *B64U 60/50* (2023.01); *G05D 1/085* (2013.01);

*G06F 3/0362* (2013.01); *B64U 50/14* (2023.01); *B64U 2101/30* (2023.01); *B64U 2201/00* (2023.01)

(58) Field of Classification Search
CPC ....... B64C 39/024; B64C 19/00; B64U 50/14; B64U 2101/30; B64U 2201/00; B64U 10/14; B64U 60/50; B64U 20/87; G06F 3/0362
See application file for complete search history.

(56) References Cited

U.S. PATENT DOCUMENTS

| | | | |
|---|---|---|---|
| 11,945,579 | B1 | 4/2024 | Nielsen et al. |
| 2010/0228406 | A1 | 9/2010 | Hamke et al. |
| 2016/0117853 | A1 | 4/2016 | Zhong et al. |
| 2017/0198747 | A1 | 7/2017 | Chen et al. |
| 2017/0200311 | A1 | 7/2017 | Pilskalns et al. |
| 2017/0337824 | A1 | 11/2017 | Chen |

(Continued)

*Primary Examiner* — Abby J Flynn
*Assistant Examiner* — Paulo Roberto Gonzalez Leite
(74) *Attorney, Agent, or Firm* — CM Law; Stephen J. Weed

(57) ABSTRACT

A UAV having a manual gimbal including a camera, and a flight mode selector configured to select both a flight mode and manually establish a camera position as a function of the selected fight mode. A controller responds to a position of the gimbal or selector to establish the flight mode. The flight mode is selected from several available modes, for example, a horizontal flight mode, a 45-degree flight mode, and a vertical (aerial) flight mode. The flight mode selector is mechanically coupled to the gimbal and establishes a pitch angle of the gimbal, and thus the camera angle attached to the gimbal.

20 Claims, 4 Drawing Sheets

(56)        References Cited

U.S. PATENT DOCUMENTS

| 2018/0022451 | A1 |   | 1/2018 | Lim |
| 2018/0297695 | A1 |   | 10/2018 | Ramirez-Serrano |
| 2019/0256224 | A1 |   | 8/2019 | Ho et al. |
| 2019/0315458 | A1 |   | 10/2019 | Gazzino et al. |
| 2019/0367166 | A1 | * | 12/2019 | Yoshimura ........... G05D 1/0016 |
| 2019/0373173 | A1 |   | 12/2019 | Wang et al. |
| 2020/0371310 | A1 |   | 11/2020 | Yu |
| 2021/0120176 | A1 |   | 4/2021 | Wang et al. |

* cited by examiner

700

| 702 |
| --- |
| Select a first flight mode |

| 704 |
| --- |
| Establish camera at a first pitch angle |

| 706 |
| --- |
| Select a second flight mode |

| 708 |
| --- |
| Establish camera at a second pitch angle |

UAV WITH MANUAL FLIGHT MODE SELECTOR

CROSS-REFERENCE TO RELATED APPLICATIONS

This application is a Continuation of U.S. application Ser. No. 16/833,526 filed on Mar. 28, 2020, the contents of which are incorporated fully herein by reference.

TECHNICAL FIELD

The present disclosure generally relates to unmanned aerial vehicles (UAVs).

BACKGROUND

UAVs, including drones, have various configurations, and in many cases a camera. UAVs may be used to capture images with their camera during flight.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Figure 1:
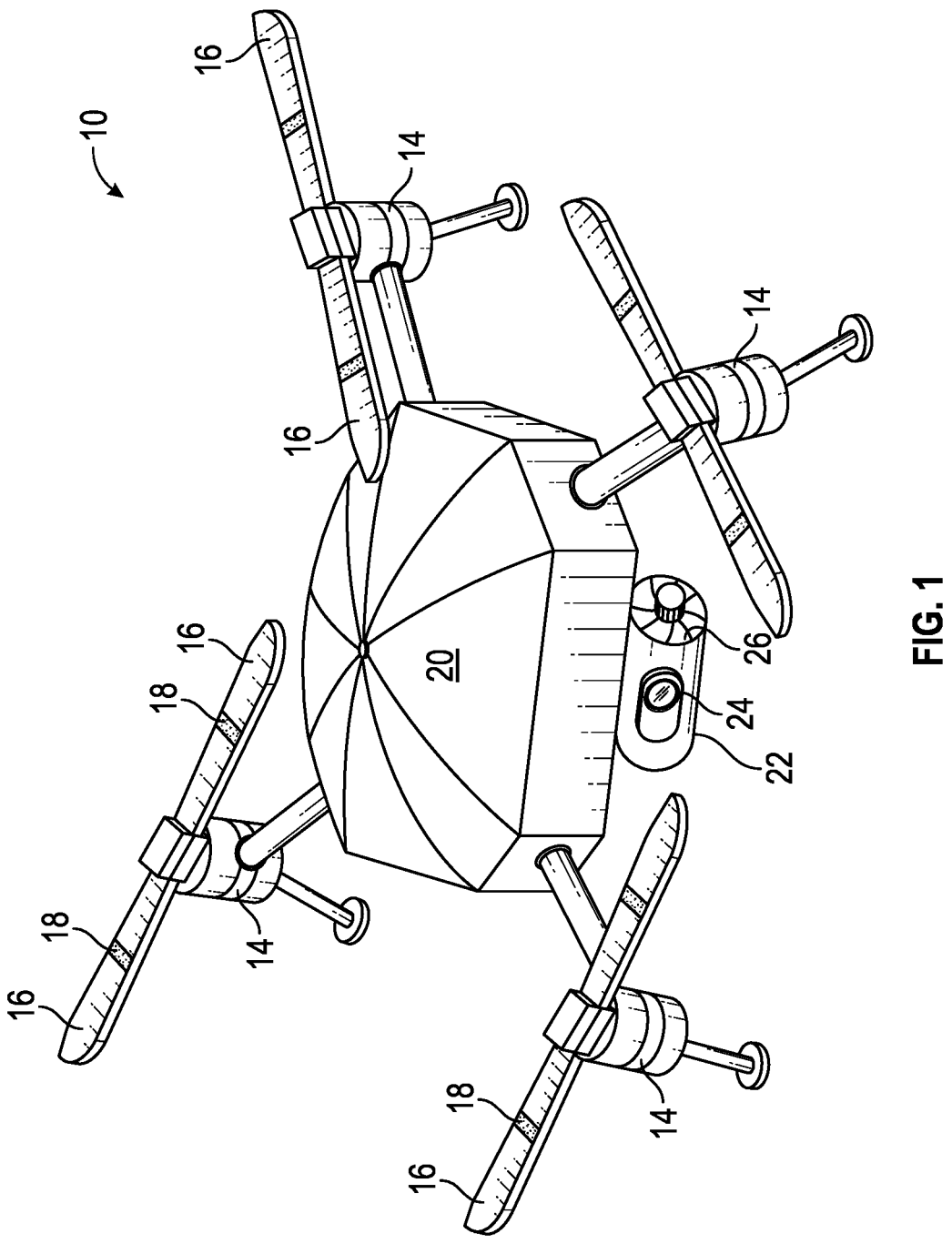
FIG. 1 illustrates a perspective view of a UAV with a manual gimbal for establishing a flight mode including a flight path for the UAV and a pitch angle of a camera of the UAV.

This disclosure provides a UAV having a manual gimbal including a camera, and a flight mode selector configured to select a flight path and manually establish a camera position. A controller responds to a position of the gimbal or selector to establish the flight path. The flight path is selected from several available paths, for example, a horizontal flight path (e.g., for use with a camera angle between 0 and 5 degrees), a 45-degree flight (e.g., for use with a camera angle between 40 and 50 degrees), and a vertical (aerial) flight mode (e.g., for use with a camera angle between 85 and 95 degrees). The flight mode selector is mechanically coupled to the gimbal and establishes a pitch angle of the gimbal, and thus the camera angle attached to the gimbal.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless described otherwise, coupled elements or devices are not necessarily directly connected to one another and may be separated by intermediate components.

Reference now is made in detail to the examples illustrated in the accompanying drawings and discussed below.

Commercial UAVs typically include a gimbal beneath a body of the UAV and include a camera for imaging the earth and other objects below, for instance, capturing still images and film. More complicated UAVs include an electronic receiver and an electronically configurable gimbal and camera. A remotely located controller establishes a wireless link with the receiver of the UAV to control the gimbal and camera. The electronic receiver, electrically controllable gimbals, and cameras are expensive, fragile, and mechanically complex, and add to the weight and bulkiness of the UAV.

FIG. 1 illustrates a perspective view of a UAV 10 having a body 20 and a plurality of propellers 14, where some or all of the blades 16 of each of the propellers 14 may have an antenna 18. Each propeller 14 includes a drive shaft that is mechanically connected to and driven by a motor (not shown). The propeller 14 including blades 16 can be made out of metal or non-conductive material. Typically, non-conductive materials, such as plastic, are used since they are cheaper to produce.

Also shown in FIG. 1 is a gimbal 22 coupled to an underside of body 20. A camera 24 is coupled to the gimbal 22. A manual flight mode selector 26, such as a rotatable knob/dial or slider, is configured to manually select a flight mode including a flight path and a position of the gimbal 22 with respect to the body 20 (and thus a flight angle of camera 24) in several predetermined positions. A linkage 28 couples the selector 26 to the gimbal 22 and establishes a position of the gimbal 22 with respect to the body 20. The linkage 28 can comprise a gear, slider, lever, pulley or other member and limitation to the specific linkage is not to be inferred. The manual flight mode selector 26 is also configured to produce an output corresponding to a flight path for the UAV 10. The manual flight mode selector may incorporate a rotary or sliding switch such a multi-pole, multi-position switch.

Figure 2:
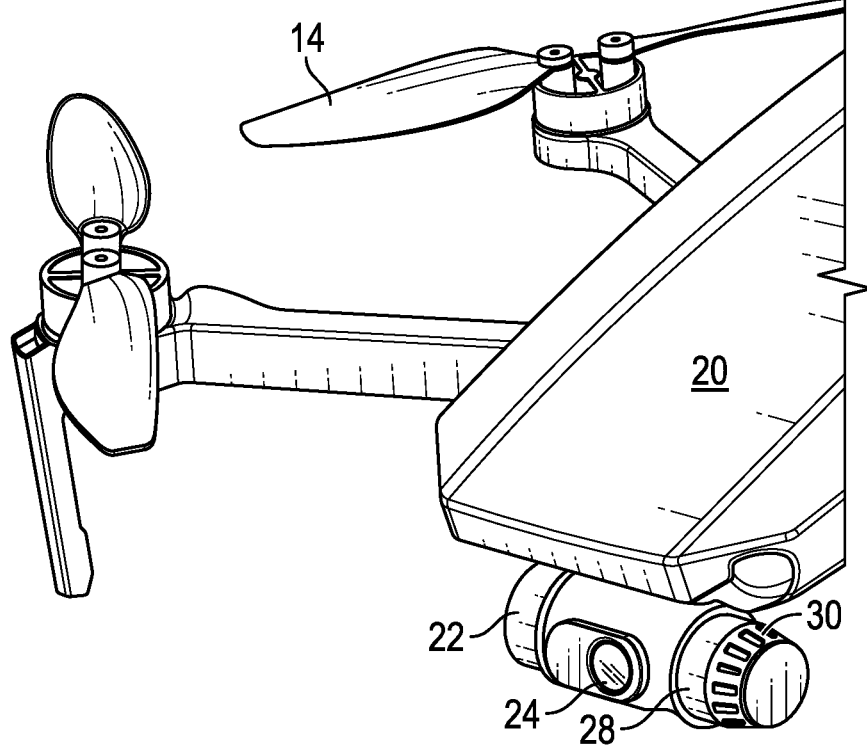
FIG. 2 illustrates a perspective view of a UAV with a dial selector directly coupled to the gimbal.

FIG. 2 illustrates an example of the selector 26 comprising a dial 30 operatively coupled to the gimbal 22 via linkage 28 to selectively establish a position of the gimbal 22 and thus the camera 24 as previously discussed.

Figure 3:
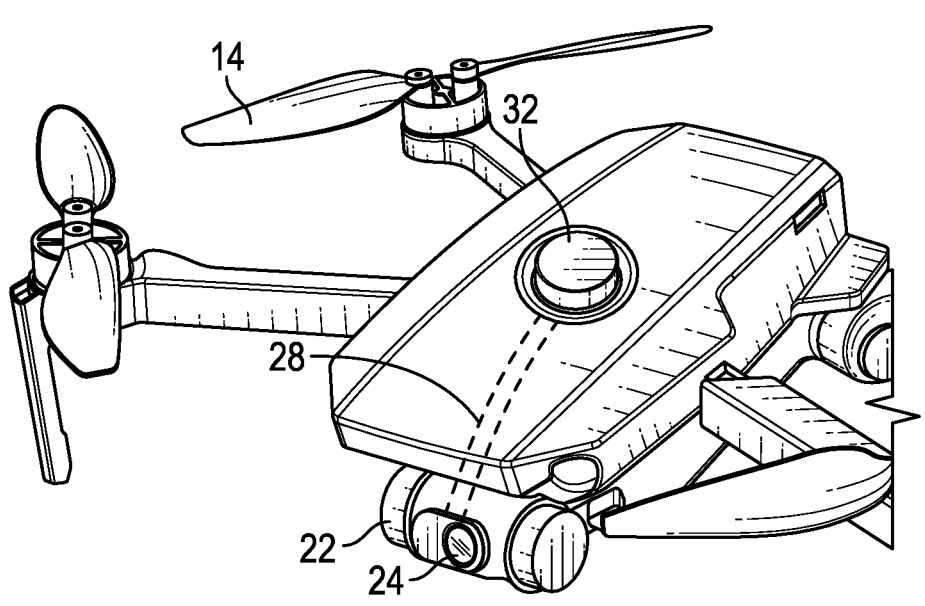
FIG. 3 illustrates a perspective view of a UAV with a knob selector located on the body of the UAV.

FIG. 3 illustrates an example of the selector 26 comprising a knob 32 positioned on top of the body 20, operatively coupled to the gimbal 22 through body 20 by linkage 28 to selectively establish a position of the gimbal 22 and thus the camera 24 as previously discussed.

Figure 4:
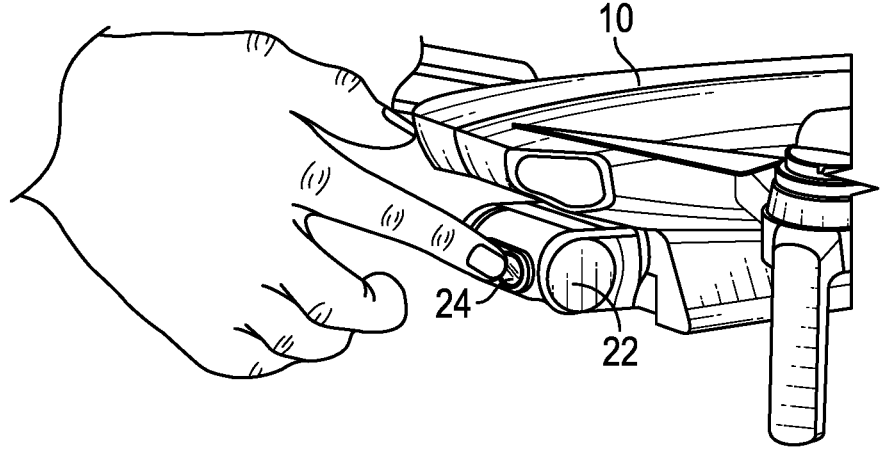
FIG. 4 illustrates a perspective view of a UAV with a push type selector directly linked to the gimbal.

FIG. 4 illustrates an example of the gimbal 22 configured to be manually rotated to set the gimbal in a selected position to establish the camera pitch angle. In this example there is no separate selector 26 as the gimbal 22 is the selector.

Figure 5:
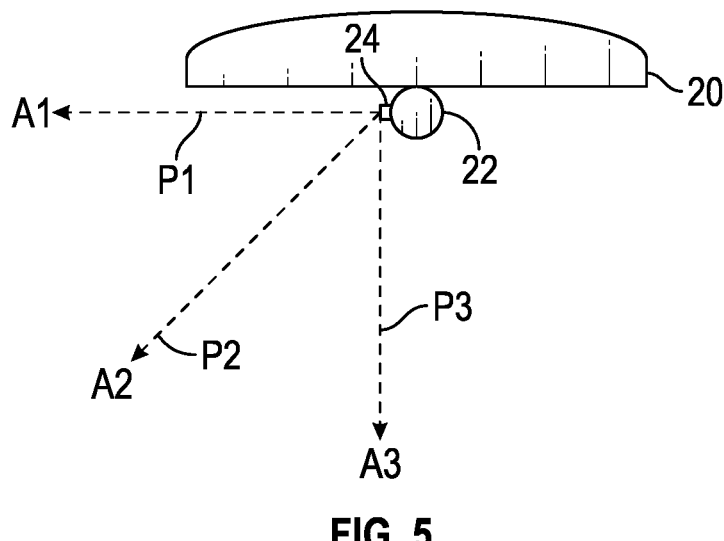
FIG. 5 illustrates several selected flight modes, and the associated camera pitch angle of each.

For instance, referring to FIG. 5, in a first selector position P1, the selector 26 establishes the gimbal 22 in a first position corresponding to a first flight mode, such as a horizontal flight mode, and thus the camera 24 at a first pitch angle A1 suitable for capturing images and film of a horizon, such as 0-5 degrees with respect to horizontal (e.g., in which the UAV 10 rises 2 meters vertically, flies 20 meters in a direction facing away from the camera field of view, pauses 3 seconds, and returns to its original position). In a second selector position P2, the selector 26 establishes the gimbal 22 in a second position corresponding to a second flight mode, such as a 45-degree flight mode, and thus the camera 24 at a second pitch angle A2 suitable for capturing images and film in the 45-degree flight mode (e.g., in which the UAV 10 rises 1 meter vertically, flies 20 meters at a 45-degree angle in a direction facing away from the camera field of view, pauses 5 seconds, and returns to its original position). In a third selector position P3, the selector 26 establishes the gimbal 22 in a third position corresponding to third flight mode, such as a vertical flight mode, also referred to as an aerial mode, and thus the camera 24 at a third pitch angle A3 suitable for capturing images and film in the vertical flight mode (e.g., in which the UAV 10 rises 20 meters vertically, pauses 10 seconds, and returns to its original position). In all flight modes P1-P3, the camera 24 is positioned to keep the framed subject matter framed appropriately. In another example, a fourth selector position P4 can be provided such that the selector 26 establishes the gimbal 22 in a fourth position corresponding to a fourth flight mode, such as a −90-degree flight mode, and thus the camera 24 is at a fourth pitch angle A4 such that the camera 24 faces straight up, suitable for capturing images and film in the −90-degree flight mode (e.g., in which the UAV 10 rises 20 meters vertically, pauses 10 seconds, and returns to its original position).

Figures 6, 7:
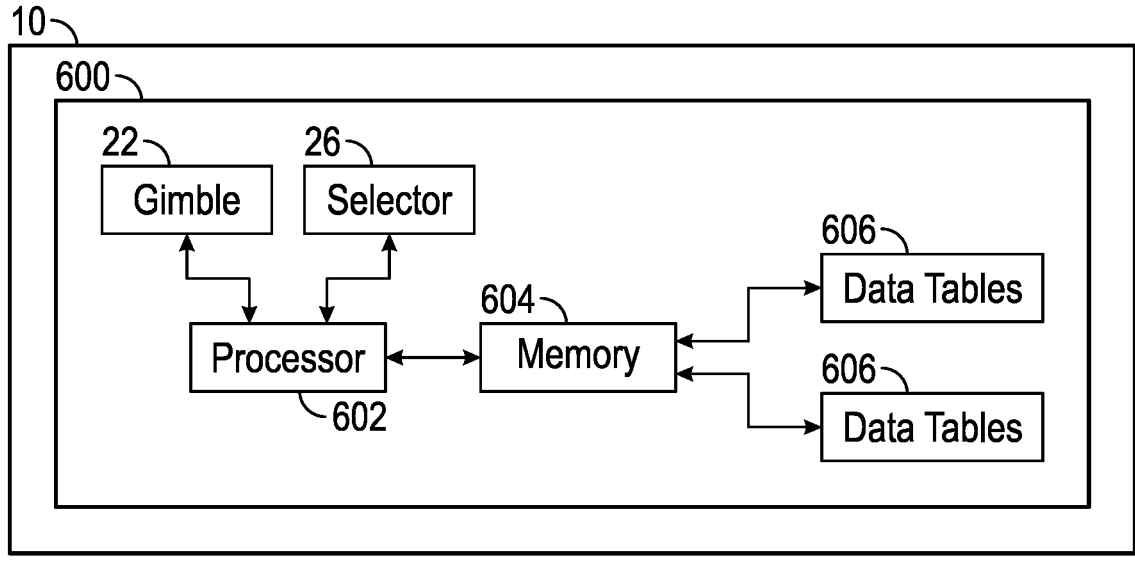
FIG. 6 illustrates a block diagram of a UAV with manual selector gimbal for establishing a flight mode including a flight path for the UAV and a pitch angle of a camera of the UAV and FIG. 7 illustrates a method of operating the UAV.

Referring to FIG. 6, there is shown control electronics 600 configured to control the UAV 10, including UAV operation and a flight path or function determined by the position of the gimbal 22 or the selector 26. The control electronics 600 include an electronic processor 602, comprising the flight controller, a memory 604 including instructions and code for operating processor 602, and data tables 606 that may be stored in memory 604 or in separate memory.

Either the selector 26 as shown in FIG. 1, FIG. 2 and FIG. 3, or the gimbal 22 as shown in FIG. 4, establish the flight path of the UAV 10. In an example, the gimbal 22, the selector 26, or both include(s) an electrical member, such as an encoder, that has a value or characteristic that is indicative of the gimbal 22 position and the selector 26 position. The electrical member is read by the processor 602 and establishes an associated flight path from data tables 606 as a function of the electrical member value or characteristic. In an example, if the processor 602 determines the gimbal 22, the selector 26, or both is in the first position P1, the processor 602 chooses a horizontal flight path from data tables 606. If the processor 602 determines the gimbal 22, the selector 26, or both is in the second position P2, the processor chooses a 45-degree angle flight path. If the processor 602 determines the gimbal 22, the selector 26, or both is in the third position P3, the processor chooses a vertical (aerial) flight path.

FIG. 7 illustrates a method 700 of operating the UAV.

At block 702, the user selects a first flight mode by manually positioning the selector 26 in the first position such that the gimbal 22 is in the first position P1, as shown in FIG. 5. Alternatively, the gimbal 22 can be manually rotated by itself, as shown in FIG. 4. The first position P1 is the horizontal mode as previously discussed. The selector 26 can be rotated in one example to a first releasably secured position, such as established by a detent. As shown, the selector 26 can be rotated, or moved through other means such as by sliding.

At block 704, the camera 24 is responsively positioned when the gimbal 22 is in position P1 to have the first pitch angle A1 as shown in FIG. 5. This first pitch angle A1 is suitable for framing images and film in the horizontal mode. The controller 602 reads the value or characteristic of the gimbal 22 or selector 26 and establishes the first flight path based on a corresponding table 606, such as a horizontal flight path.

At block 706, the user selects a second flight mode by manually positioning the selector 26 in the second position such that the gimbal 22 is in the second position P2, as shown in FIG. 5. Alternatively, the gimbal 22 can be manually rotated by itself, as shown in FIG. 4. The second position P2 is the 45-degree mode as previously discussed. The selector 26 can be rotated in one example to a second releasably secured position, such as established by a detent.

At block 708, the camera 24 is responsively positioned when the gimbal 22 is in position P2 to have the second pitch angle A2 as shown in FIG. 5. This second pitch angle A2 is suitable for framing images and film in the 45-degree mode. The controller 602 reads the value or characteristic of the gimbal 22 or selector 26 and establishes the second flight path based on a corresponding table 606, such as a 45-degree flight path.

The user can also select the third flight mode by manually positioning the selector 26 in the third position such that the gimbal 22 is in a third position P3, as shown in FIG. 5. Alternatively, the gimbal 22 can be manually rotated by itself, as shown in FIG. 4. The third position P3 is the vertical mode as previously discussed. The selector 26 can be rotated in one example to a third releasably secured position, such as established by a detent. Although three flight modes are shown and described, fewer (e.g., 2) or more (e.g., 4-10) flight modes may be implemented.

The camera 24 is responsively positioned when the gimbal is in position P3 to have the third pitch angle A3 as shown in FIG. 5. This third pitch angle A3 is suitable for framing images and film in the horizontal mode. The controller 602 reads the value or characteristic of the gimbal 22 or selector 26 and establishes the third flight path based on a corresponding table 606, such as a vertical flight path.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim.

Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. An unmanned aerial vehicle (UAV), comprising:
a body;
at least one of propeller coupled to the body;
a gimbal coupled to the body; and
a camera coupled to the gimbal;
wherein the gimbal has a plurality of settings configured to set flight modes of the UAV, wherein the gimbal is configured to be manually set without electronics, wherein a first said setting establishes a first said flight mode corresponding to a first flight path prior to flight and corresponding to a first position of the gimbal and a first camera pitch angle of the camera, and a second said setting establishes a second said flight mode corresponding to a second flight path prior to flight and corresponding to a second position of the gimbal and a second camera pitch angle of the camera, wherein the UAV does not have a receiver configured to receive flight control data.

2. The UAV of claim 1, further comprising an electrical controller configured to establish the flight path of the UAV as a function of the flight mode corresponding to the gimbal setting.

3. The UAV of claim 2, wherein the first setting establishes a horizontal flight path of the UAV.

4. The UAV of claim 2, wherein the second setting establishes a 45-degree flight path of the UAV.

5. The UAV of claim 2, wherein the gimbal has a third setting establishing a vertical flight path of the UAV.

6. The UAV of claim 1, wherein the gimbal establishes the camera pitch angle between 0 and 90 degrees with respect to the body.

7. The UAV of claim 1, further comprising a manual selector coupled to the gimbal.

8. The UAV of claim 1, further comprising:
a manual selector indirectly coupled to the gimbal via a mechanical linkage extending between the manual selector and the gimbal.

9. The UAV of claim 8, wherein the manual selector is a slider, dial or a knob.

10. The UAV of claim 1, further comprising:
a manual selector directly coupled to the gimbal, wherein the manual selector is selectively securable in each of the first position and the second position.

11. A method of operating an unmanned aerial vehicle (UAV) comprising a body, at least one propeller coupled to the body, a gimbal coupled to the body, and a camera coupled to the gimbal, wherein the gimbal and has a plurality of settings configured to set flight modes of the UAV, wherein the gimbal is configured to be manually set without electronics, wherein a first said setting establishes a first said flight mode corresponding to a first flight path corresponding to a first position of the gimbal and a first camera pitch angle, and a second said setting establishes a second said flight mode UAV corresponding to a second flight path corresponding to a second position of the gimbal and a second camera pitch angle, wherein the UAV does not have a receiver configured to receive flight control data, comprising:
establishing the gimbal in the first setting prior to flight such that the gimbal has the first position and the camera has the first camera pitch angle and the UAV operates in the first mode; and
establishing the gimbal in the second setting prior to flight such that the gimbal has the second position and the camera has the second camera pitch angle and the UAV operates in the second mode.

12. The method of claim 11, wherein the UAV comprises an electrical controller establishing the flight path as a function of the gimbal setting.

13. The method of claim 11, wherein the first setting establishes a horizontal mode of the UAV.

14. The method of claim 11, wherein the second setting establishes a 45-degree mode of the UAV.

15. The method of claim 11, wherein the gimbal has a third setting establishing a vertical mode of the UAV.

16. The method of claim 11, wherein a manual selector establishes the camera pitch angle between 0 and 90 degrees with respect to the body.

17. The method of claim 11, further comprising a manual selector coupled to the gimbal.

18. The method of claim 17, wherein the manual selector is indirectly coupled to the gimbal via a mechanical linkage extending between the manual selector and the gimbal.

19. The method of claim 17, wherein the manual selector is a dial or a knob.

20. The method of claim 17, wherein the manual selector is directly coupled to the gimbal, and the manual selector is selectively securable in each of a first position and a second position.

* * * * *